United States Patent Office 3,215,055
Patented Nov. 2, 1965

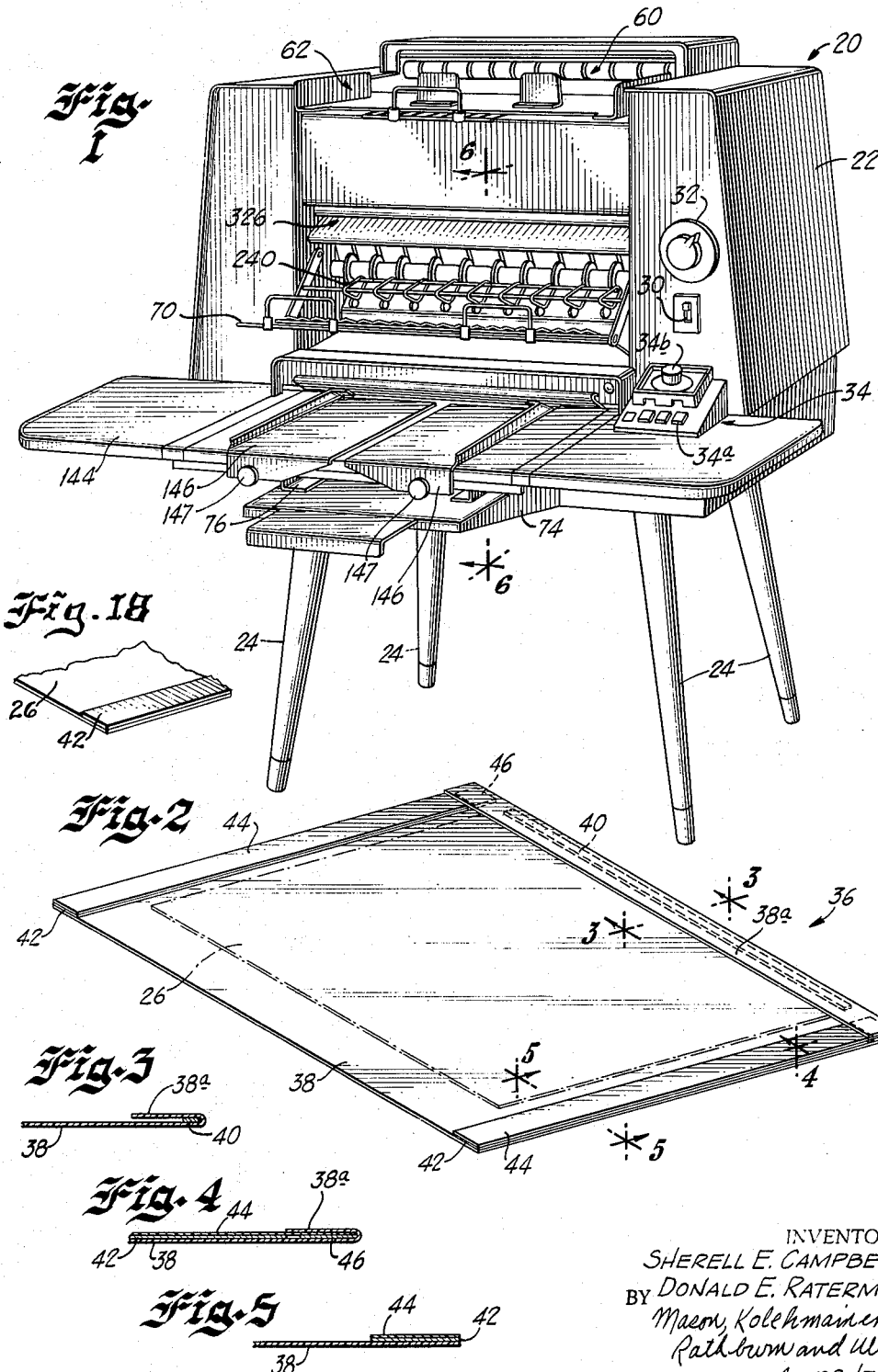

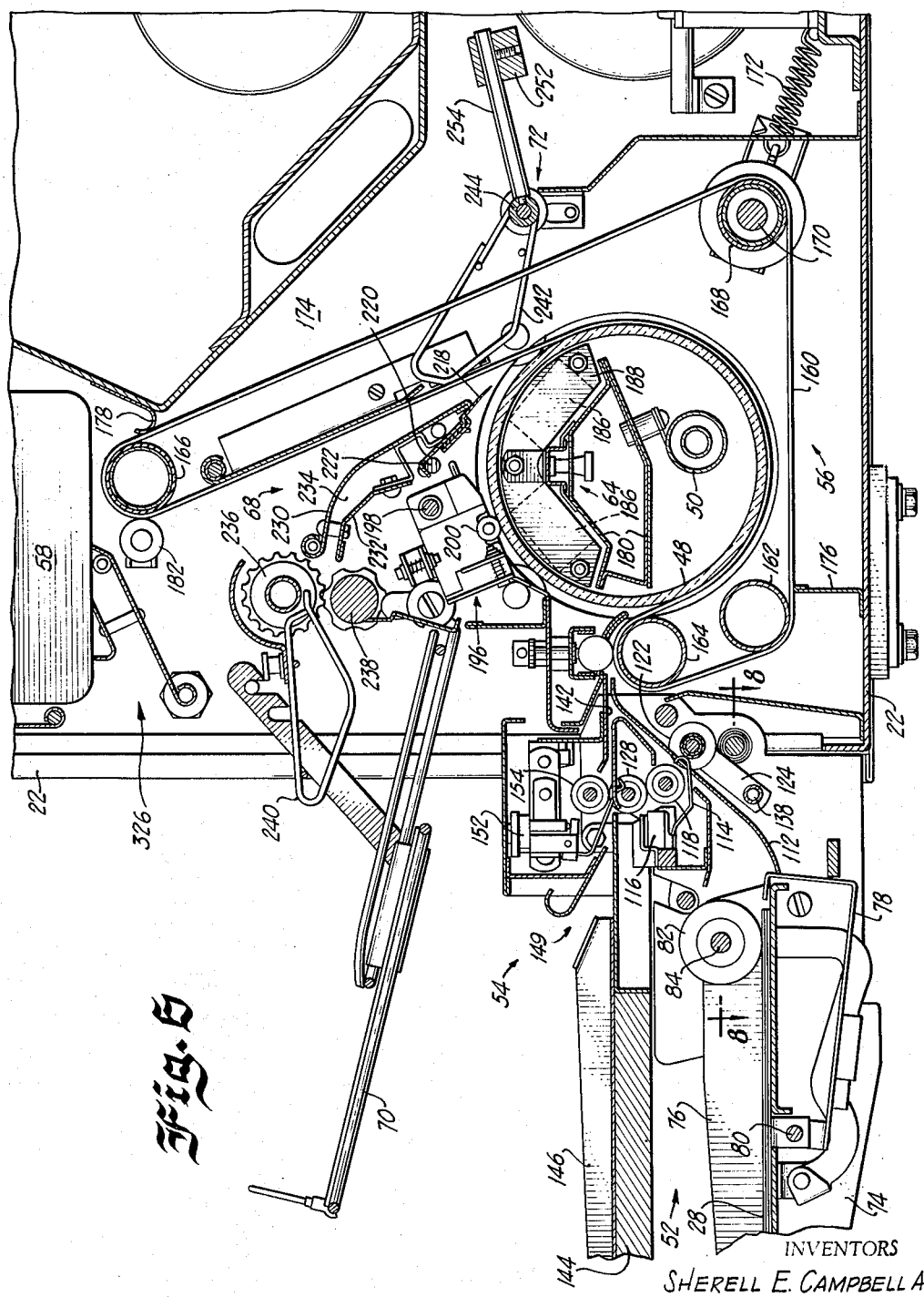

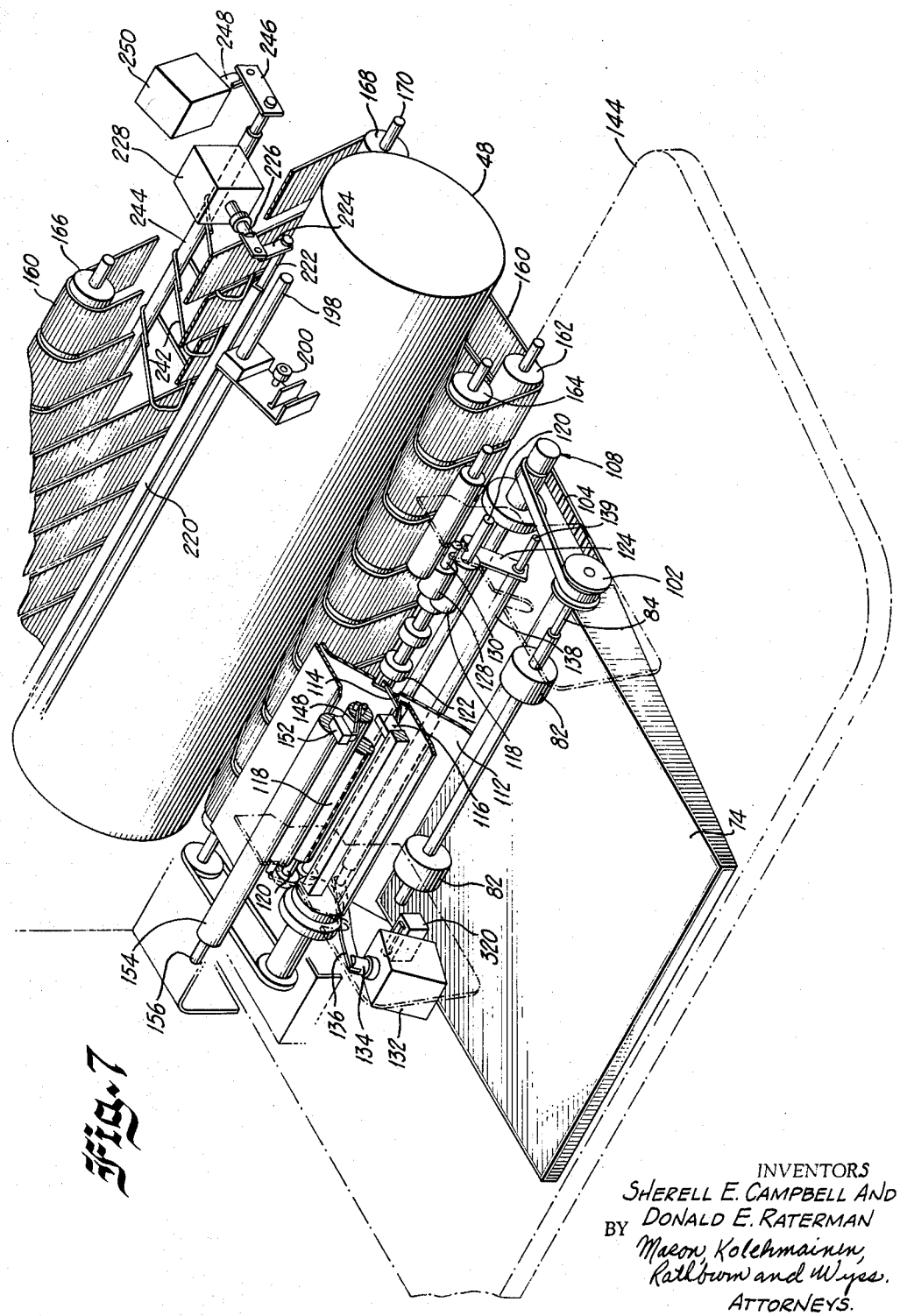

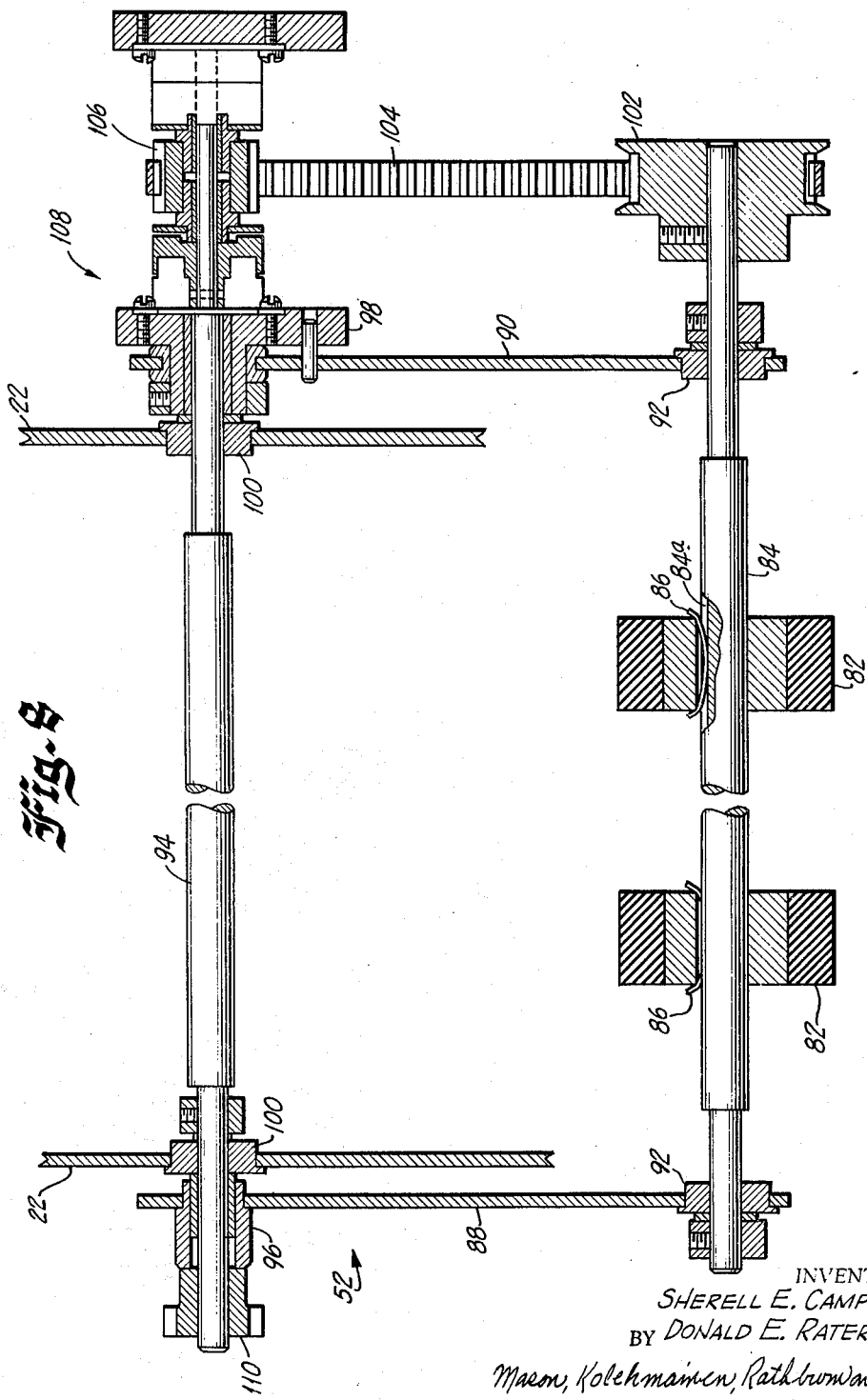

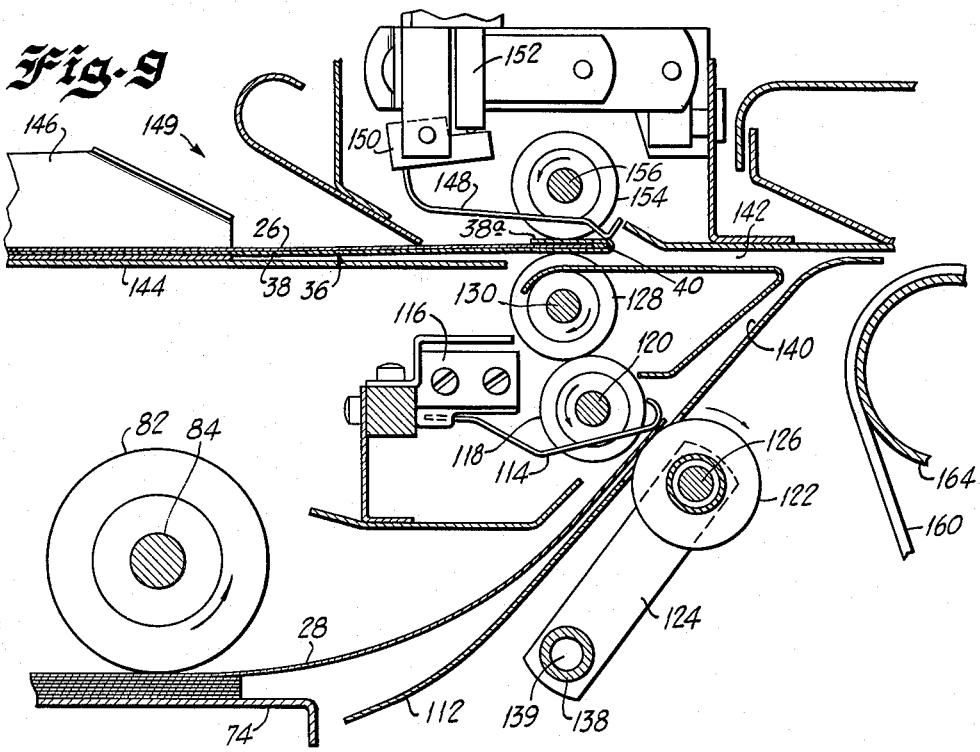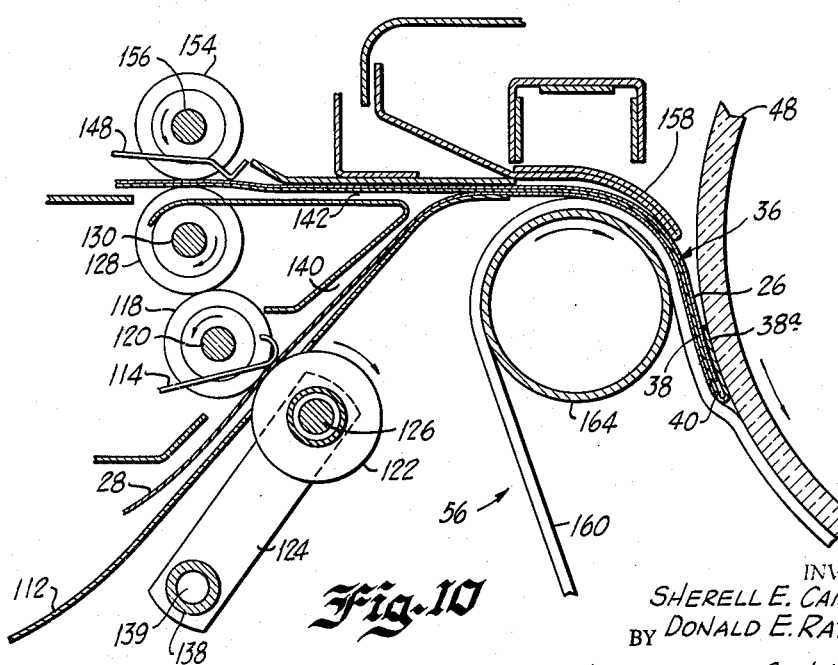

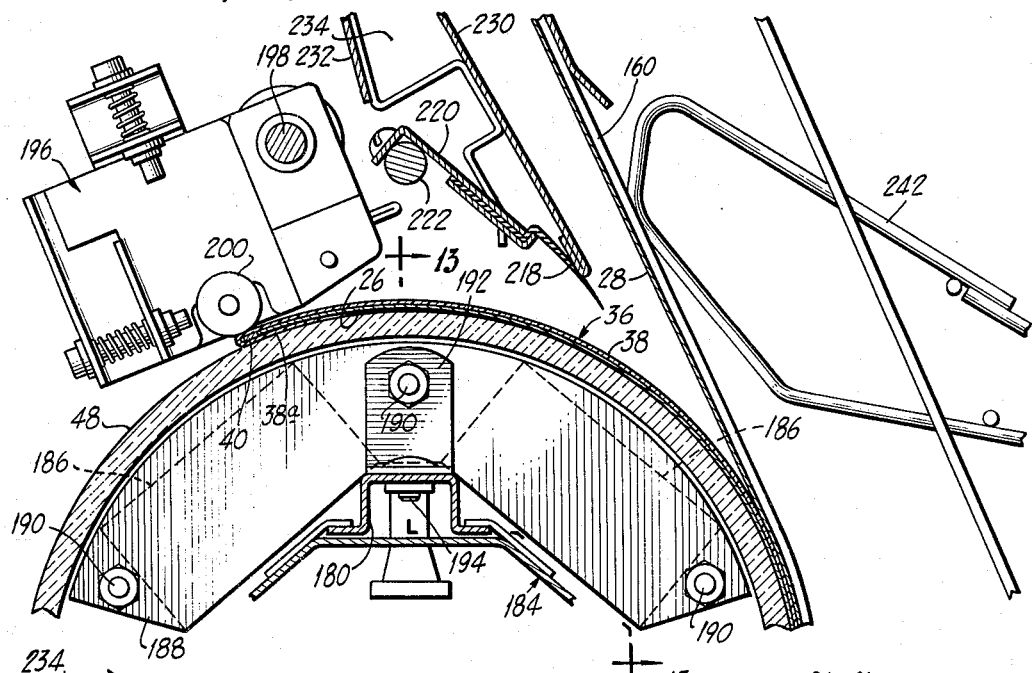
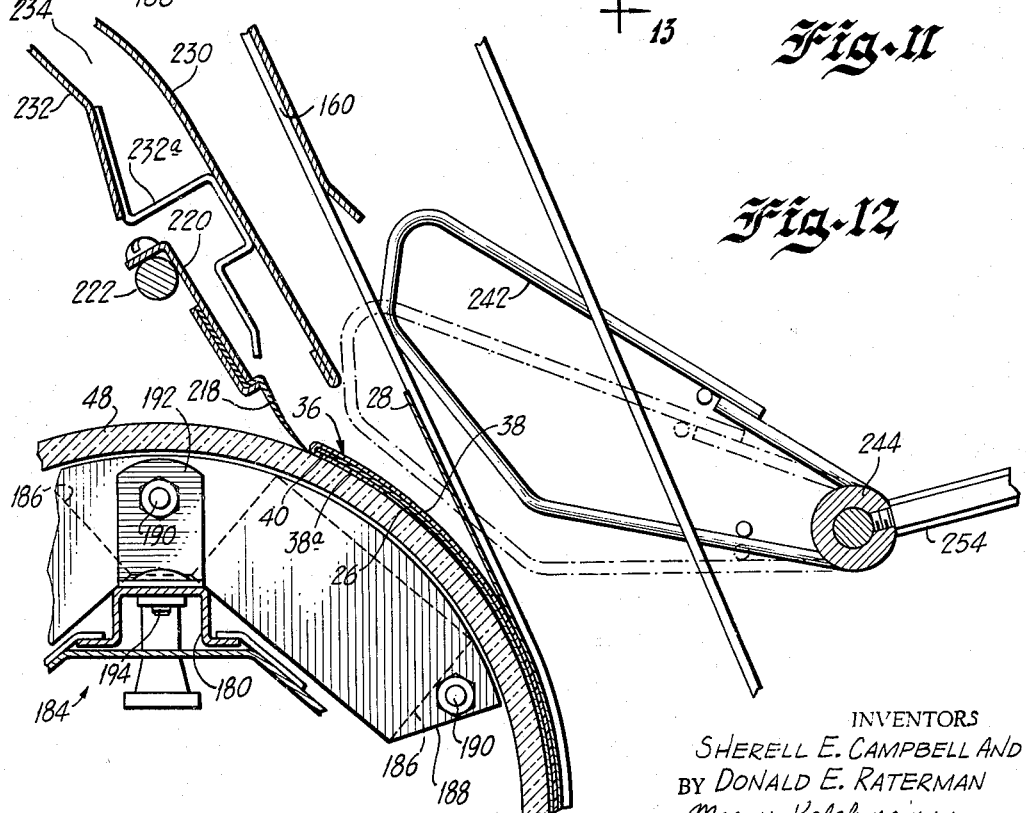

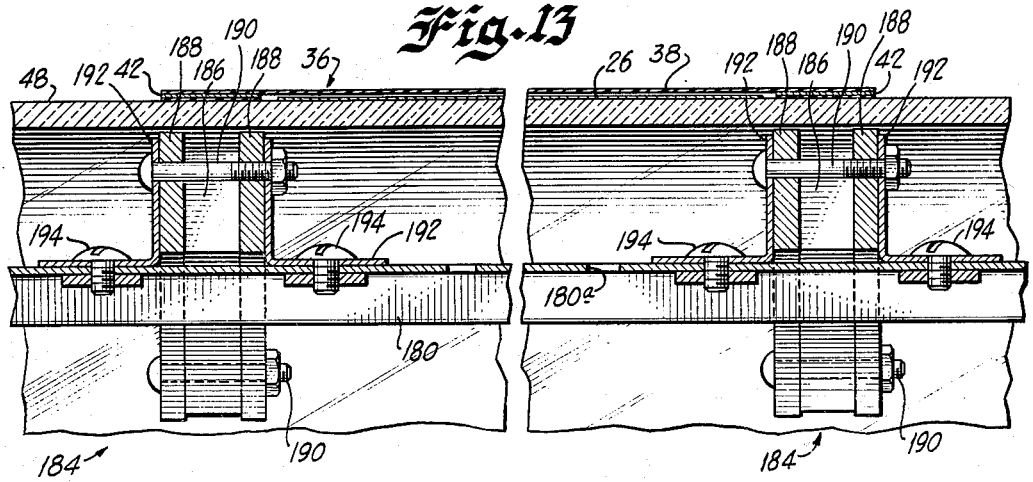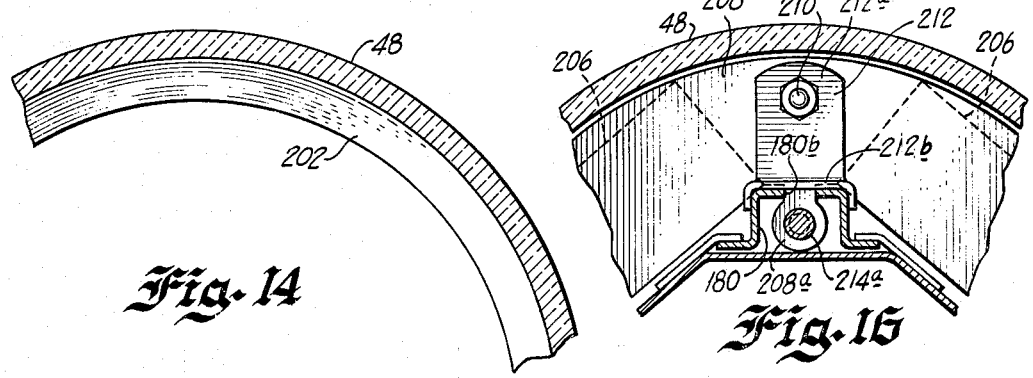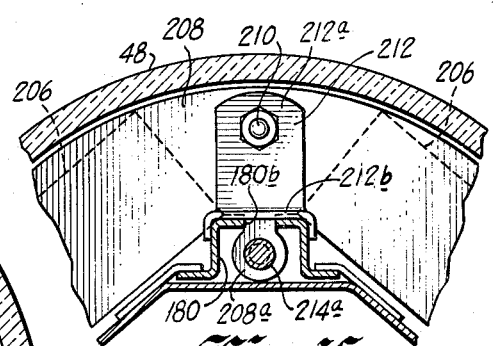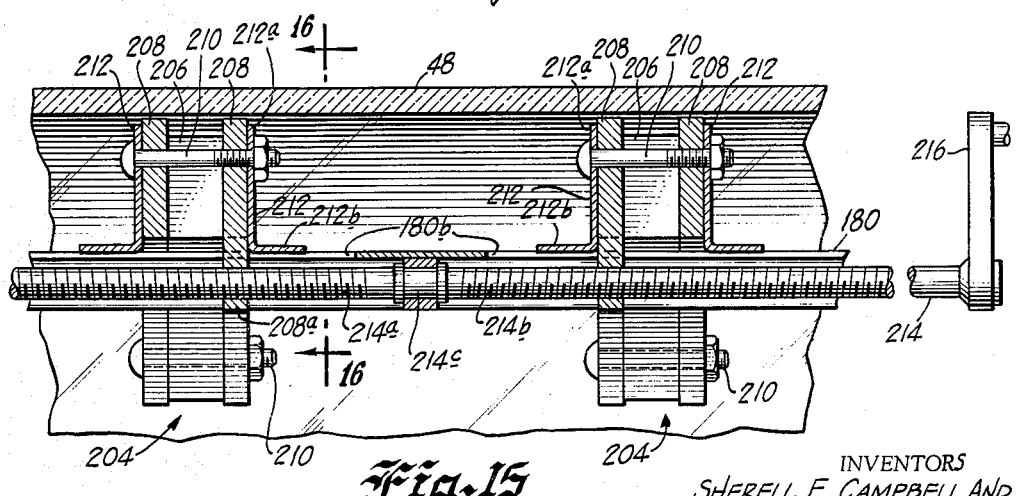

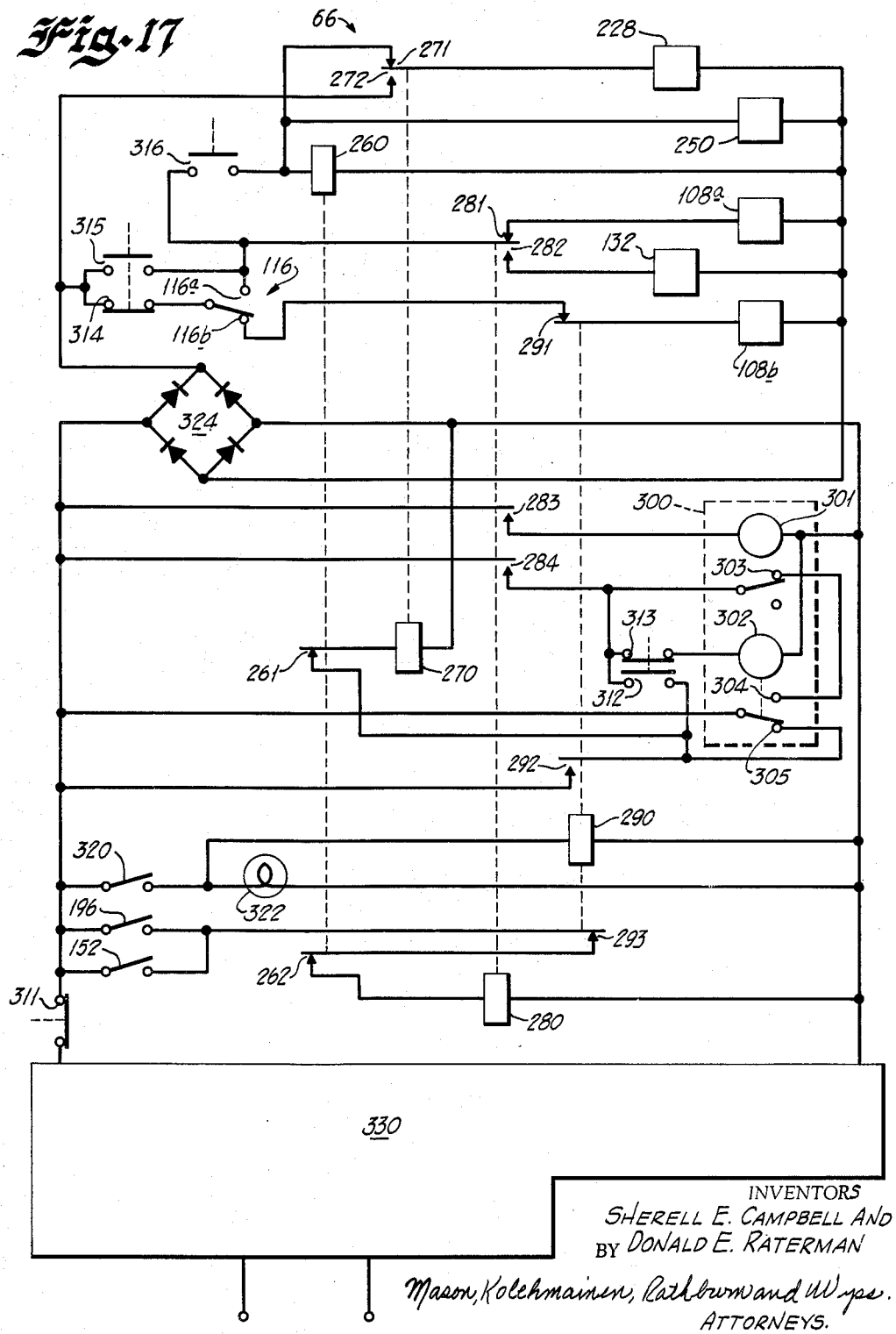

3,215,055
AUTOMATIC COPYING MACHINE
Sherell E. Campbell, Palatine Township, Cook County, and Donald E. Raterman, Niles, Ill., assignors to Addressograph-Multigraph Corporation, a corporation of Delaware
Filed June 28, 1963, Ser. No. 291,444
13 Claims. (Cl. 95—77.5)

This invention relates to automatic copy machines of the contact printing type and, more particularly, to new and improved means for automatically controlling and handling multiple sheet elements in the various operations of making copies from an original.

Modern business establishments frequently require apparatus for making good quality reproductions rapidly and at a low cost per copy. Reproduction systems that are available do not fully meet these requirements. Processes which are capable of turning out low cost, high quality copies frequently do not qualify for system applications because of the time required to make copies. Diazo process, or the direct process as it is sometimes called, for example, affords extremely good quality prints at low cost. However, equipment using the diazo process does not enjoy full utilization when a short to medium or long run of copies is required because it is a contact printing process. As a contact printing process, each copy requires the hand assembly of a copy sheet with the original. This becomes extremely slow and cumbersome in applications in which multiple copies are required from the same original, as in a business system application. The repeated feeding of the original for each copy is slow, and may cause damage to the original. Other requirements of many business systems are the ability to selectively block out portions of the original which are not to be reproduced and the ability to combine subject matter from various originals on a composite reproduction in one pass through a machine. To accomplish this on presently available equipment is cumbersome and slow.

Accordingly, one object of the present invention is to provide a new and improved copying apparatus.

Another object is to provide a copying machine including new and improved means for making a plurality of copies from an original.

Another object is to provide a copying apparatus in which an original to be copied is retained in the apparatus until a selected number of copies has been made on copy sheets automatically fed to the machine and is then automatically ejected.

A further object is to provide a contact printing machine including new and improved control means for automatically feeding copy sheets into a superimposed relation with an original carried on a rotating drum.

Another object is to provide a copying apparatus including new and improved means for feeding an original to be copied into the apparatus and for selectively ejecting the original after a selected number of copies have been made.

A further object is to provide a copying apparatus in which an original to be copied is partially wrapped around a rotating drum and in which new and improved means are provided for controlling the separation of the original from the drum and its subsequent ejection.

Another object is to provide a copying machine including new and improved means for selectively controlling the machine to produce one or a plurality of copies from an original.

Another object is to provide a copying apparatus of the type including a rotating drum in which control means are provided for selectively controlling the feeding of copy sheets to the machine and detection of the continued presence of the original on the rotating drum.

In accordance with these and many other objects, one embodiment of the invention comprises a direct contact or diazo printing or copying machine comprising a transparent rotating drum in which is mounted a light source. When the machine is to be conditioned for making a plurality of copies of the single original, the desired number of copies is set into a counting register, and the original is disposed in a transparent flexible carrier including a pair of flexible magnetic strips disposed adjacent the edge portion beyond the outer edges of the original. When the original disposed in the carrier is inserted into the machine, two sheet feeding mechanisms are automatically placed in operation. The first of these advances the carrier and the original to a position adjacent the rotating drum and the second controls a copy sheet feeding assembly so that a sheet of copy paper is advanced to a position adjacent the rotating drum in a superimposed relationship with the original and the carrier. This superimposed assembly is then advanced between the rotating drum and a flexible guide means comprising a plurality of looped resilient belts. The guiding means holds the assembly of the original, the carrier, and the copy sheet in engagement with the drum so that this assembly passes by the light source for exposure thereby.

To provide means for separating the exposed copy sheet, the guiding means includes an outwardly extending run that communicates with a vacuum chest or source which tends to hold the copy sheet in engagement with the flexible guide means. At the upper end of the outwardly extending run, the copy sheet is fed into a diazo developing unit in which the exposed copy sheet is developed and discharged to a collecting rack or shelf on the machine. To prevent the separation of the original when multiple copies of the original are desired, magnetic means are disposed within the drum with the fields produced by the magnetic means in general alignment with the magnetic strips on the carrier. The influence of the magnetic fields on the magnetic strips becomes appreciable at the point in the path of rotation of the drum at which the copy is separated. Thus, the magnetic fields attract the magnetic portions and hold the carrier together with the original in contact with the outer periphery of the drum so that it passes beyond the point at which the copy sheet is separated.

To provide means for controlling the production of a number of copies of the retained original, a switching device is disposed adjacent the drum in the portion thereof in which the carrier is influenced by the magnetic fields of the magnetic holding means. When the retained original and carrier pass by the switching means, the switching means is actuated to control the copy sheet feeding means to advance an additional copy sheet to a position in proximity to the drum. The leading edge of the carrier and original reach the copy sheet feeding point at the same time so that a second copy sheet is now superimposed upon the original in the carrier to permit this second copy to be made in the manner described above. The actuation of the switching device by the retained original and carrier on the drum also supplies a signal to the counting register to indicate that a single copy has been produced. The switching or control device actuates the counting register and advances an additional copy sheet into a superimposed relation with the original until such time as the number of copies produced by the machine equals the desired number previously set into the counting register.

At this time, the register energizes an electromechanical control device which moves an ejector or separator blade into engagement with the outer periphery of the rotating drum at a point advanced slightly in the direction of rotation of the drum from the point at which the copy sheet is ejected. When the leading edge of the carrier and original reaches this point, this assembly is deflected to a second discharge channel and ejected at the front of the machine by suitable feed rollers. In this manner, the apparatus operates to automatically produce the desired number of copies of a single flexible original in response to insertion of the original in the machine and to eject the original following the completion of the desired number of copies.

The machine can also be conditioned to operate in a different mode in which the original and the exposed copy sheet are ejected at the end of each operation. This permits the exposed copy sheet to be manually supplied to the developer unit through a different inlet to the developer. When the machine is operated in this mode, the control unit is adjusted to cause the operation of electromechanical means so that the original ejector blade is maintained in engagement with the outer periphery of the drum. In addition, a copy sheet rake or deflecting means is moved from an inactive to an active position at the point at which the flexible guiding means moves away from the periphery of the drum to close this discharge channel. The automatic copy sheet feeding means is also disabled.

When the copy sheet and the original disposed in the carrier are fed to the rotating drum in the manner described above, this assembly of superimposed sheets is exposed by the light source in the manner described above and both the carrier with the retained original and the copy sheet are ejected through the channel or other means previously used for the ejection of only the carrier and the original. The copy sheet can then be separated from the original and manually fed to the developer unit.

Many other objects and advantages of the present invention will become apparent from considering the following detailed description in conjunction with the drawings in which:

FIG. 1 is a perspective view of a copying apparatus embodying the present invention;

FIG. 2 is a perspective view of a flexible carrier used for transporting an original to be copied through the machine illustrated in FIG. 1;

FIG. 3 is an enlarged fragmentary sectional view taken along the line 3—3 of FIG. 2;

FIG. 4 is an enlarged fragmentary sectional view taken along the line 4—4 in FIG. 2;

FIG. 5 is an enlarged fragmentary sectional view taken along the line 5—5 in FIG. 2;

FIG. 6 is an enlarged fragmentary sectional view taken along line 6—6 in FIG. 1;

FIG. 7 is a fragmentary perspective view of means provided in the copying machine for feeding and advancing copy sheets and the original to be copied;

FIG. 8 is an enlarged sectional view of a copy sheet feeding assembly included in the feeding means shown in FIG. 7;

FIG. 9 is a detail view of an assembly for feeding an original and a copy sheet in a synchronized relation, the assembly shown in an inactive or normal position;

FIG. 10 is a detail view similar to FIG. 9 illustrating the assembly in an active or operating condition;

FIG. 11 is a detail view of an assembly for ejecting the original from the copying machine shown in an inoperative position;

FIG. 12 is a detail view similar to FIG. 11 illustrating the ejecting means in an active or operated condition;

FIG. 13 is an enlarged fragmentary sectional view of the magnetic means for retaining the carrier and original on a drum included in the copying machine;

FIG. 14 is a fragmentary sectional view of a modification of the magnetic holding means;

FIG. 15 is a sectional view of another modification of the magnetic holding means in FIG. 13 in which the position of the magnetic means can be adjusted;

FIG. 16 is a sectional view taken along line 16—16 in FIG. 15;

FIG. 17 is a schematic diagram of a circuit for controlling the operation of the copying machine; and FIG. 18 is a fragmentary view illustrating an original, carrying a magnetic strip.

Referring now more specifically to FIG. 1 of the drawings, therein is disclosed a copying apparatus or machine which is indicated generally as 20 and which embodies the present invention. The machine 20 includes a housing or supporting structure 22 carried by a plurality of ground engaging feet or legs 24. The machine 20 is adapted to make one or a plurality of copies, either manually or automatically, of an original 26 (FIG. 2) on copy sheets 28 (FIG. 6) by diazo or contact printing methods. The machine 20 includes an on-off switch 30 (FIG. 1) for controlling the energization of the machine, a manually adjustable means 32 for controlling exposure time, and a control unit 34 for selecting the number of copies to be produced and for conditioning the machine 20 for different modes of operation. All of these controls are supported on the housing or frame 22 and are externally accessible to permit manual adjustment.

To provide means for transporting the original 26 through the machine 20 and for retaining this original in a position permitting repeated exposure of the copy sheets 28 when a plurality of copies are to be printed, a carrier assembly indicated generally as 36 (FIGS. 2–5) is provided. The carrier 36 includes a web or sheet 38 of transparent plastic or flexible material having a reverse bend portion 38a forming a leading edge. A rigid element 40, which can be made of magnetic material, is disposed within the reverse bend 38a to provide a rigid leading edge construction for the carrier 36. To provide means for releasably retaining the carrier assembly 36 in position within the machine 20, the opposite side edges of the sheet 38 are provided with two rearwardly extending strips 42 of flexible magnetic material which are secured to one surface of the sheet 38. A layer of plastic covering material 44 is disposed over each of the magnetic strips 42. A pair of magnetic elements 46 are also disposed in alignment with and form continuations of the strips 42 within the reverse bend portion 38a of the sheet 38 forming the leading edge of the carrier 36. The magnetic strips or portions 42 can also be applied directly to the original 26 as shown in FIG. 18.

In its general arrangement, the machine 20 includes a rotating transparent drum 48 (FIG. 6) containing a line light source 50 to which one of the copy sheets 28, the carrier assembly 36, and the original 26 are fed in a superimposed relation by a copy sheet feeding assembly indicated generally as 52 and an original feeding assembly indicated generally as 54. This superimposed assembly is fed past the light source 50 to expose the copy sheet through the cooperation of the rotating drum 48 and a flexible guiding means or assembly indicated generally at 56 which holds the assembly in engagement with the rotating drum 48 through a first portion of the path of rotation of this drum. After the copy sheet 28 has been exposed, it is separated from the drum 48 and the original 26 by the guiding means 56 and is advanced to a developer unit indicated generally as 58 in which it is developed and subsequently discharged from a drying oven included therein by a flexible belt conveyor 60 (FIG. 1). The discharged copies are retained in a rack 62 provided adjacent the top of the housing 22.

When more than a single copy of the original 26 is to be produced, the carrier assembly 36 with the original 26 mounted thereon is retained in engagement with the outer periphery of the drum 48 by a magnetic holding assembly 64 (FIG. 6) so that the carrier 36 passes beyond the point at which the copy sheet 28 is separated. In moving beyond this separation point, a control circuit 66 (FIG. 17) detects the presence of the retained carrier assembly 36 and operates the copy sheet feeding assembly 52 to supply an additional copy sheet 28 to a position adjacent the drum 48 at which it is disposed in a superimposed relation with the carrier 36 and the original 26. This permits the exposure of a second copy sheet 28 to produce a second copy of the original 26 in the manner described above.

The control circuit 66 is also actuated as additional copy sheets 28 are supplied by the assembly 52 to register the number of produced copies in a register to which has been supplied the number of desired copies. When the desired number of copies has been produced, an original ejecting or separating assembly 68 (FIG. 6) is actuated to separate the carrier 36 with the retained original 26 from the outer periphery of the drum 48 and to discharge this subassembly in a collecting rack or tray 70 (FIGS. 1 and 6) disposed at the front of the machine 20.

When the machine 20 is conditioned for single copy, manual operation, the unit 34 controls the circuit 66 to operate a deflector or rake assembly 72 (FIG. 6) to a position in which the copy sheet discharge channel extending to the developer 58 is closed. The control circuit 66 also operates the assembly 68 so that the channel normally used for ejecting the original 26 and the carrier assembly 36 is opened. The original 26 to be reproduced is then assembled on the carrier 36 with a superimposed copy sheet 28, and this assembly is inserted into and advanced by the assembly 54. The copy sheet, which is exposed during movement of the drum 48 relative to the light source 50, is not directed to the developer unit 58 but is discharged to the tray or rack 70 by the assembly 68 concurrently with the carrier 36 and the original 26. The exposed copy sheet 28 can then be manually fed to the developer unit 58 to develop the exposed image.

Referring now more specifically to the copy sheet feeding assembly 52, this assembly includes a copy supporting table 74 (FIGS. 1 and 6) provided with a pair of opposed and adjustable edge guides 76 between which a stack of copy sheets 28 is disposed. Rearwardly extending upper end portions of two spaced paper retaining arms 78 that are pivotally mounted on a shaft 80 carried by the table 74 rest on the outer corners of the leading edge of the upper copy sheet 28 to provide means for restraining forward movement thereof.

To provide means for feeding the uppermost sheet 28 in the supply stack thereof, a pair of friction rollers or wheels 82 are slidably keyed to a shaft 84 (FIGS. 6, 7, and 8) by a pair of springs 86 disposed within elongated slots 84a formed in the shaft 84. The drive wheels or rollers 82 rest on the upper sheet 28 in the stack with the end portions of the shaft 84 extending outwardly through slots (not shown) in the edge guides 76. The ends of the shaft 84 are rotatably mounted on the outer ends of a pair of pivotally mounted supporting links 88 and 90 by a pair of bushings or bearings 92. The other end of the link or arm 88 is pivotally mounted adjacent one end of a shaft 94 by a bearing or bushing 96, and the inner end of the arm 90 is similarly secured to a member 98 that is pivotally mounted adjacent the opposite end of the shaft 94. The shaft 94 is pivotally mounted on the supporting frame 22 by a pair of bushings 100. The pivotal mounting for the arms 88 and 90 permits the feed rollers 82 to rest on the upper sheet 28 in the supply stack thereof.

To provide means for selectively rotating the shaft 84 and the connected wheels 82, a toothed pulley 102 is rigidly secured to one end of the shaft 84 and carries a toothed, resilient drive belt 104 that also passes around a toothed pulley 106 in a combined clutch-brake assembly indicated generally as 108. This assembly is of a well known construction and, for example, can be obtained from the Haydon Division, General Time Corp. of Torrington, Connecticut. In general, when one of a pair of winding means in the assembly 108 is energized, the pulley 106 is connected to one end of the shaft 94, the other end of which is secured to a pinion gear 110 continuously driven by a drive motor (not shown) included in the machine 20. Thus, the pulley 106 is effective in this setting of the assembly 108 to rotate the shaft 84 through the drive belt 104 and the pulley 102. In its alternate condition in which another solenoid or winding in the assembly 108 is energized, the pulley 106 is uncoupled from the shaft 104 so that rotation of the shaft 84 is immediately terminated.

Whenever the machine 20 is initially placed in operation by the on-off switch 30, the control circuit 66 operates the assembly 108 to a clutch setting so that the shaft 84 is driven to rotate the feed wheels 82. This forces the uppermost copy sheet 28 upwardly or to the right (FIG. 6) so that the leading edge of this sheet is forced over the detent members 78 and into engagement with a guiding plate 112. This sheet 28 moves upwardly until its edge engages and displaces an operator arm 114 (FIGS. 6 and 9) of a switch 116 mounted on the frame 22 of the machine 20. The actuation of the switch 116 controls the circuit 66 to operate the assembly 108 from a clutch setting to a brake setting in which further rotation of the shaft 84 and the wheels 82 is terminated to arrest further feeding movement of the sheet 28.

The sheet 28 remains in this position (FIG. 9) until such time as the carrier assembly 36 and an original 26 are fed into the feeding assembly 54. In the position shown in FIG. 9, the leading edge of the copy sheet 28 is interposed between a resilient drive roller 118 carried on a shaft 120 and a plurality of axially spaced idler rollers 122 rotatably mounted on the upper ends of a pair of arms or links 124 by a shaft 126. The drive roller 118 is continuously engaged by a resilient drive roller 128 carried on a shaft 130 that is continuously rotated by the drive motor of the machine 20.

When a carrier 36 is advanced into the assembly 54, the control circuit 66 energizes a solenoid 132 (FIG. 7) so that it retracts its armature 134. The upper end of the armature 134 is pivotally connected to a link 136 which is rigidly secured at its other end to one end of a sleeve 138 to which the arms 124 (FIGS. 7 and 9) are secured. The sleeve 138 is pivotally mounted on a shaft 139. Thus, the downward movement of the armature 134 pivots the sleeve 138 in a counterclockwise direction (FIGS. 7 and 9) so that the arms 124, the shaft 126, and the idler rollers 122 move to the position shown in FIG. 10 in which the leading edge of the copy sheet 28 is biased against the continuously rotating drive roller 118. This advances the copy sheet 28 upwardly through a paper guiding channel or throat 140 formed in part by the plate 112 so that the copy sheet 28 is moved into a superimposed relationship with the carrier 36 and original 26 being advanced by the assembly 54 through another channel or guideway 142.

This operation continues until such time as the trailing edge of the copy sheet being advanced by the idlers 122 and the drive roller 118 passes beyond the free end of the operator arm 114. At this time, the operator arm 114 releases the switch 116 to control the circuit 66 so that the solenoid 132 is released. When the solenoid 132 is released to permit the armature 134 to move upwardly, the sleeve 138 is pivoted in a clockwise direction from the position shown in FIG. 10 to the position shown in FIG. 9 so that the idlers 122 move out of engagement with the driven roller 118. In addition, the control circuit 66 supplies a control signal to the assembly 108 (FIG. 7) so that the shaft 84 is again driven by the shaft 94 to advance the next copy sheet 28 to the position shown in FIG. 9. When the operator 114 is again engaged by the leading edge of this next copy sheet 28, the actuation of the switch 116 controls the circuit 66 to operate the assembly 108 from its clutch or drive setting to a brake or stop setting. The assembly 52 now remains in the position illustrated in FIG. 9 until such time as the control circuit 66 is actuated either by the insertion of another carrier assembly 36 into the assembly 54 or by a demand for another copy sheet 28 to make a second copy of the previously supplied original 26.

Referring now more specifically to the assembly 54 for feeding the carrier 36 and the original 26 to a superimposed position with the copy sheet 28 supplied by the assembly 52, this assembly includes a portion of a table or shelf 144 projecting outwardly from the front of the machine 20 (FIG. 1) on which a pair of edge guides 146 are slidably mounted to be secured in spaced positions by manually adjustable means 147 corresponding to the width of the carrier 36 being used. When one of the carriers 36 with an assembled original 26 is to be inserted into the machine 20, the leading edge thereof is advanced over the table 144 between the edge guides 146 and into an entrance throat 149 (FIG. 6) until the leading edge of the carrier 38 strikes and upwardly deflects an operator arm 148 (FIG. 9) which is secured to an arm 150 pivotally mounted on the supporting frame. This pivotal movement of the arm 150 actuates a control switch 152 to advise the control circuit 66 that a carrier 36 is being inserted into the machine. In response to the receipt of this information, the control circuit 66 operates the copy sheet feeding assembly 52 to advance the partially fed copy sheet 28 in the position illustrated in FIG. 9 by moving the rollers 122 into engagement with the drive roller 118.

The driven roller 128 continuously engages a resilient idler roller 154 which is mounted on a rotatable shaft 156 so that the rollers 128 and 154 are continuously rotated. As the operator arm 148 is engaged by the leading edge of the carrier 36, the carrier also enters the nip of the rollers 128 and 154 and is advanced by these rollers through the throat or channel 142 to move into an aligned and superimposed position with a copy sheet 28 supplied by the assembly 52 (FIG. 10). During movement of the superimposed carrier 36, original 26 and copy sheet 28, a downwardly curved guiding structure 158 at the end of the channel 142 directs the leading edge of the assembly downwardly to a position interposed between the outer periphery of the rotating drum 48 and the guide means 56 so that further movement of this assembly is produced by the rotation of the drum 48. When the trailing edge of the carrier 36 moves beyond the end of the operator arm 148, the arm 150 pivots in a clockwise direction (FIGS. 9 and 10) to release the switch 152.

The guide means 56 (FIGS. 6 and 7) comprises a plurality of flexible belts 160 which pass around three rotatable rollers 162, 164, and 166 carried on the supporting frame 22 of the machine 20. The plurality of belts 160 also pass around a roller 168 that is rotatably mounted on a shaft 170 which is movable relative to the supporting frame 22 and which is biased to the right (FIG. 6) by one or more connected tension springs 172 that apply tension to the flexible belts 160. These belts are spaced slightly from each other along the axes of the rollers, as illustrated in FIG. 7, and form a wall of a vacuum chest or chamber 174. This chamber is also defined by the structural elements of the housing 22 including flexible or resilient elements 176 and 178 (FIG. 6) which bear against spaced portions of the belts 160. As illustrated in FIG. 6 of the drawings, the outer or left-hand surface of the left-hand runs of the belts 160 is exposed to the atmosphere, and the right-hand surfaces thereof are in communication with a blower or air impelling means, which maintains a slight degree of vacuum or negative pressure in the chamber 174. Thus, when the outer surface of the copy sheet 28 is positioned in engagement with the belts or webs 160, a slight pressure differential is applied across the sheet tending to hold it in engagement with these belts. If desired, the air discharged from the blower can be discharged through the axial opening in the rotating drum 48 to remove any heat generated by the lamp 50.

When the leading edge of the assembled carrier 36, original 26, and copy sheet 28 are directed downwardly by the guide means 158 (FIG. 10), this leading edge is resiliently biased against the moving outer surface of the rotating drum 48 by the moving belts 160 in proximity to the roller 164. Thus, this assembly is carried by the drum 48 and the flexible belts 160 in a counterclockwise direction (FIG. 6) so that the copy paper 28 is exposed by the light source 50 which is supported within the rotating drum 48 by a supporting structure 180 adjacent a lower portion of the drum 48. During continuing rotation of the drum 48, the pressure differential maintained across the belts 160 holds the exposed copy sheet 28 so that it is moved upwardly as illustrated in FIGS. 11 and 12 to be moved past an idler roller 182 and into an inlet into the developer unit 58. The exposed copy sheet 28 is then developed and discharged by the conveying means 60 (FIG. 1) into the recveiving tray 62.

If more than a single copy of the original 26 is to be made, the carrier 36 and the original 26 mounted thereon are not separated from the drum 48 but are held in position thereon by the magnetic holding assembly 64 (FIGS. 6, 11, 13, and 14). The magnetic holding assembly 64 comprises two magnetic field producing means 184 (FIG. 13) supported adjacent the upper end of the interior of the rotating drum 48 by the supporting structure 180 in positions aligned with the magnetic strips 42 on the carrier assembly 36. Each of the magnetic field producing means 184 includes a pair of permanent magnets 186 (FIGS. 11 and 13) disposed between two magnetic elements or pole pieces 188 and secured in positions therebetween by a plurality of fasteners 190 which extend through the plates or pole pieces 188. The center fasteners 190 pass through the upwardly extending legs of a pair of L-shaped brackets 192, the other legs of which are secured to the supporting structure 180 by fasteners 194. The supporting bracket 180 includes a plurality of apertures 180a (FIG. 13) to permit the magnetic field generating means 184 to be disposed in various positions in accordance with the width of the carrier assembly 36 and the spacing of the magnetic elements 42.

As illustrated in FIGS. 6 and 11 of the drawings, the extent of the pole pieces 188 is such that the magnetic fields provided by the means 184 become effective substantially at the point at which the copy sheet 28 is separated from the carrier 36 and extends to a point adjacent the guide means 158 (FIG. 10). As soon as the magnetic strips 42 on the carrier 36 move into the fields generated by the permanent magnets 186, the carrier assembly 36 is detachably held in engagement with the outer periphery of the rotating drum 48 and is not separated therefrom when the exposed copy sheet 28 is removed. Thus, the carrier assembly 36 with the original 26 mounted thereon is rotated in a counterclockwise direction with the drum 48 through the remainder of the path of revolution of this drum to be advanced to the point at which it is supplied with the next copy sheet 28 in those operations in which more than a single copy is to be produced.

To provide means for supplying information to the control circuit 66 indicating that the original 26 and the carrier 36 have been retained on the drum 48, a switch construction indicated generally as 196 (FIGS. 6, 7, and 11) is adjustably positioned on a supporting rod 198 immediately above the upper surface of the drum 48. The switch assembly 196 includes a roller 200 that is normally biased into engagement with the outer periphery of the drum 48. When the leading edge of the carrier 36 strikes the roller 200, the switch assembly 196 is actuated to indicate to the control circuit 66 that the original 26 has been retained on the drum 48 for additional printing or copying operations.

FIGURE 14 of the drawings illustrates a modified form of magnetic holding means comprising two rings 202 of flexible permanent magnetic material carried on the inner surface of the drum 48 in alignment with the positions at which the magnetic strips 42 on the carrier assembly 36 are fed to the cylinder 48. This flexible permanent magnetic material is well known and can comprise, for example, a "Koroseal" flexible strip manufactured by B. F. Goodrich Industrial Products Company of Akron, Ohio. The use of the two rings or strips 202 of permanent magnetic material carried on the inner surface of the drum 48 provides a magnetic holding action for the carrier 36 during a complete cycle of revolution of the drum 48.

FIGURES 15 and 16 illustrate another modification of the magnetic holding assembly 64 in which two magnetic field generating means 204 are slidably mounted on the supporting structure 180 to permit these two field generating means to be adjusted to different positions along the axis of rotation of the drum 48. This permits the field generating means 204 to be aligned with differently spaced magnetic strips 42 on carrier assemblies 36 of different sizes or configurations without requiring the reassembly of the holding means shown, for instance, in FIG. 13.

The magnetic field generating means 204 each include a pair of permanent magnets 206 disposed between two magnetic plates or pole pieces 208 which are secured in clamping engagement with the interposed permanent magnets 206 by a plurality of fasteners 210. The center fasteners 210 pass through the upwardly extending legs 212a of two opposed brackets 212 having flanged lower legs 212b slidably mounted on the upper surface of a generally U-shaped channel forming a part of the supporting structure 180. Two of the pole pieces or plates 208 are provided with portions 208a which depend through slots 180b in the structure 180 and which threadedly receive oppositely threaded portions 214a and 214b of an adjusting shaft 214. A central portion 214c of the shaft 214 is journaled on the supporting structure 180, and an outer end of the shaft 214 preferably is provided with a handle 216 that is accessible at the exterior of the housing 22 of the machine 20. By rotating the handle 216, the field generating means 204 can be moved closer together or spaced further from each other. Thus, whenever carriers 36 on which the magnetic strips 42 are spaced different distances are to be used, a suitable adjustment of the handle 216 moves the magnetic field producing means 204 into alignment with the strips 42.

The assembly 68 (FIGS. 6, 11, and 12) for removing the original 26 and the carrier assembly 36 from the rotating drum 48 is controlled by the circuit 66 to discharge the assembled carrier 36 and original 26 either after the selected number of copies have been produced or following a single exposure operation when the machine 20 is conditioned for manual operation. The assembly 68 includes a resilient ejector or deflector blade 218 (FIGS. 11 and 12) that is secured to a supporting bracket 220 carried on a pivotally mounted shaft 222. One end of the shaft 222 is rigidly connected to a link 224 (FIG. 7) that is pivotally connected to an extension on an armature 226 of a solenoid 228.

When the solenoid 228 is released, the shaft 222 and the ejector blade 218 occupy the position shown in FIGS. 6 and 11 of the drawings in which the blade is spaced from the outer periphery of the rotating drum 48 and engages the lower end of a plate 230 which together with a plate 232 forms an ejection channel or guideway 234. The plates 230 and 232 can be connected by one or more edge guides 232a. In the position shown in FIG. 11, the ejector blade 218 and the supporting bracket 220 effectively close the lower end of the guideway 234.

When the carrier assembly 36 and the original 26 during automatic operations or the superimposed carrier 36, original 26, and copy sheet 28 on manual operations are to be ejected, the control circuit 66 energizes the solenoid 228 (FIG. 7) so that the armature 226 is retracted to pivot the shaft 222 in a clockwise direction to move the ejector blade 218 from the position shown in FIG. 11 to the position shown in FIG. 12. In this position, the lower free end of the blade 218 is resiliently biased into engagement with the outer surface of the rotating drum 48. When the leading edge of the carrier assembly 36 engages this blade, the carrier assembly 36 together with the original 26 and, in some instances, the copy sheet 28, are separated from the outer surface of the drum 48 against the attractive force exercised by the magnetic holding assembly 64. The continuing rotation of the drum 48 and the flexible belts 160 moves the carrier assembly 36 and the sheet or sheets carried thereon upwardly through the discharge channel 234. A pair of rollers 236 and 238 (FIG. 6) disposed adjacent the upper end of the guideway 234 engage the carrier 36 and the superimposed sheet or sheets and move these elements outwardly from the guideway 234 so that the leading edge of the assembly engages a deflector or guide 240 and is discharged downwardly into the tray 70 (FIG. 1). When the solenoid 228 is released to permit the armature 226 to return to its normal position, the shaft 222 pivots in a counterclockwise direction from the position shown in FIG. 12 to the position shown in FIG. 11 in which the ejector blade 218 is spaced from the outer periphery of the rotating drum 48.

The assembly 72 (FIGS. 6, 7, 11, and 12) is provided for separating the copy sheets 28 from the vertically extending flight of the flexible belts 160 and prevents the separation of these copy sheets and the feeding of these sheets into the developer unit 58. The assembly 72 is maintained in the ineffective position shown in FIGS. 6 and 11 when the machine 20 is conditioned for automatic operation and is operated to its active position preventing the feeding of the copy sheet 28 to the developer unit 58 when the machine 20 is conditioned for manual operation.

The assembly 72 includes a plurality of wire deflecting elements 242 formed as closed loops having one end secured to a shaft 244. The elements 242 are aligned with and are adapted to move through the spaces between adjacent ones of the belts 160. One end of the shaft 244 is rigidly connected to a link 246 (FIG. 7) that is pivotally connected to an armature 248 of a solenoid 250. A counterweight 252 (FIG. 6) is connected to the shaft 244 by a rod or shaft 254.

When the machine 20 is conditioned for automatic operation, the solenoid 250 is released, and the counterweight 252 pivots the shaft 244 so that deflecting loops or elements 242 occupy the position illustrated in FIGS. 6 and 11 of the drawings in which the outer ends of the elements 242 are retracted behind the flexible belts 160. When the control circuit 66 energizes the solenoid 250, the armature 248 is retracted, and the link 246 and the shaft 244 are pivoted in a counterclockwise direction from the position shown in FIGS. 6 and 11 to the position shown in FIGS. 7 and 12 (dashed outline). Thus, the counterclockwise rotation of the shaft 244 moves the outer or free ends of the deflecting elements 242 to a position adjacent the element 230 (FIG. 12). In this position and even though the copy sheet 28 is held against the flexible belt 160 by the vacuum chamber 174, the outer ends of the arms 242 strip the copy sheet 28 from the belts 160 and force the sheet into the open end of the guideway 234 through which it is discharged together with the carrier 36 and the original 26 which have been separated from the outer surface of the rotating drum 48 by the ejector blade 218. When the solenoid 250 (FIG. 7) is released, the counterweight 252 pivots the shaft 244 in a clockwise direction to retract the ends of the deflector arms 242 between the belts 160 and to restore the ability of the machine 20 to supply exposed copy sheets 28 directly and automatically to the developer unit 58.

The control circuit 66 (FIG. 17) includes means for controlling the feeding and ejection of the carrier assembly 36 and the copy sheets 28 which are illustrated in detail and additional circuit means 330 shown in block form which are supplied with alternating current energy and which control the energization and operation of such units as the blower motor, the lamp 50, and the drive motor for the rotating components in the machine 20. These components are placed in an operative condition when the on-off switch 30 (FIG. 1) is actuated. The actuation of the on-off switch 30 also supplies alternating current potential through the circuit 330 to the remainder of the control circuit 66 shown in detail in FIG. 17.

This portion of the control circuit 66 is selectively controlled to prepare the machine 20 for different types of operation by the control unit 34 (FIG. 1) which comprises four selector buttons representing "off," "automatic," "manual," and "reject." The selective actuation of the four push buttons 34a selectively opens and closes a plurality of contacts 311–316 in accordance with the nature of the operation to be performed by the machine 20.

The control circuit 66 also includes a counting register 300 which is adjusted to a setting representing the desired number of copies when the machine 20 is conditioned for automatic operation by adjustment of a manual knob 34b (FIG. 1) in the control unit 34. The register or counter 300 (FIG. 17) can be of any of the well known constructions and, for example, can comprise a Model HZ–150 "Cycle-Flex" unit which is manufactured by the Eagle Signal Company, a division of Gamewell Co., in Moline, Illinois. In general, when the knob 34b is adjusted to a setting representing a desired number of copies, a mechanical counter is adjusted to a setting representing the desired number of copies. A solenoid 302 in the counter 300 can be energized to connect a ratchet type advancing mechanism controlled by a solenoid 301 to the mechanical counter. The solenoid or winding 302 also opens a pair of normally closed contacts 305 and closes a pair of normally open contacts 304. The solenoid or winding 301, when energized, advances the counting mechanism from the position to which it was set by the knob 34b toward a zero position. When the mechanical counter has been returned to its zero position, the contacts 303 are mechanically opened, and the counter 300 is reset to its previous condition.

When the machine 20 is to be placed in operation, a supply of copy sheets 28 is placed beneath the rollers 82 on the table 74, and the edge guides 76 are adjusted to a suitable position with the ends of the detents 78 resting on the upper sheet 28 in the stack. The machine 20 is then turned on by actuating the one-off switch 30 so that the light source 50 is illuminated and the various drive and blower motors in the machine 20 are placed in operation. If desired, the exposure control 32 can be adjusted to a range compatible with the type of originals 26 to be reproduced. The original 26 to be copied is placed in the carrier assembly 36 and the edge guides 146 are adjusted to thep roper spacing. If the machine 20 is provided with the type of magnetic holding means illustrated in FIGS. 15 and 16 of the drawings, the crank 216 is adjusted so that the two magnetic field generating means 204 are adjusted to positions that will be aligned with the magnetic strips 42 on the carrier assembly 36.

Assuming that a number of copies of the original 26 are desired, the control unit 34 is operated by adjusting the knob 34b to the number of the desired copies. In addition, the automatic push button 34a is depressed to selectively operate the contacts 311–316 to the settings representing an automatic operation. More specifically, the actuation of the automatic button 34a closes the contacts 311, 313 and 314 and opens the contacts 312, 315, and 316.

When the contacts 311 are closed, the alternating current potential supplied by the portion 330 of the control circuit 66 is applied across the operating winding of a relay 270 over a circuit including the closed contacts 305 and a pair of normally closed contacts 261. This operates the relay 270 so that a pair of contacts 271 are opened and a pair of contacts 272 are closed. The closure of the contacts 272 connects the solenoid 228 in the assembly 68 across the output of a fullwave rectifier bridge 322 that is energized by the closure of the contacts 311. This operates the solenoid 228 so that the shaft 222 (FIG. 12) is pivoted in a clockwise direction to move the blade 228 into engagement with the outer periphery of the rotating drum 48. This operation, however, does not perform any useful function at this time.

The output of the bridge 324 is also applied across a clutch winding 108b in the assembly 108 (FIG. 8) over a circuit including the closed contacts 314, a pair of normally closed contacts 116b in the switch assembly 116, and a pair of normally closed contacts 291. The energization of the clutch winding or solenoid 108b engages the pulley 106 (FIG. 8) with the shaft 94 so that the shaft 84 is rotated. This rotates the wheels 82 engaging the upper copy sheet 28 in the stack so that it is advanced along the plate 112 to the position in which the operator arm 114 (FIG. 6) is deflected to actuate the switch assembly 116 (FIG. 9). The actuation of the switch assembly 116 opens the contacts 116b and closes a pair of contacts 116a. The opening of the contacts 116b interrupts the above-described circuit for the clutch winding 108b so that this clutch releases to terminate rotation of the shaft 84. The closure of the contacts 116a connects the output of the bridge network 324 across a brake winding 108a in the assembly 108 over a circuit including the closed contacts 314 and 116a and a pair of normally closed contacts 281. The energization of the brake winding 108a positively brakes rotation of the pulley 106 and prevents movement of the shaft 84. Thus, the feeding movement of the top copy sheet 28 is terminated with this sheet in the position illustrated in FIG. 9 in which it is prepared for movement into a superimposed relation with an inserted carrier 36 and the original 26.

The operator then advances the carrier assembly 36 carrying the original 26 through the throat 149 to the position shown in FIG. 9 in which the leading edge of the carrier assembly 36 is disposed between nip of the rollers 128 and 154 and in which the operator 148 is deflected to actuate the switch 152. When the switch 152 (FIG. 17) is closed, an operating circuit is completed for a relay 280 extending through two pairs of normally closed contacts 293 and 262. This operates the relay 280 to open the contacts 281 and to close a plurality of contacts 282, 283, and 284. The opening of the contacts 281 interrupts the above-described operating circuit for the brake circuit 108a in the assembly 108 so that the brake is removed from the shaft 84 to permit the wheels 82 to turn as the partially fed copy sheet 28 is advanced. The closure of the contacts 282 connects the solenoid 132 in the assembly 54 across the output of the bridge network 324 so that this solenoid is energized to move the link 136 (FIG. 7) downwardly and pivot the sleeve 138 in a counterclockwise direction about the shaft 139. This moves the plurality of idler rollers 122 to the position shown in FIG. 10 so that the interposed portion of the partially fed copy sheet 28 is biased against the driven roller 118. This advances the leading edge of the copy sheet 28 through the guideway 140 toward the guideway 142 in which it is placed in a superimposed relationship with the assembled carrier 36 and original 26 which have been advanced by the rollers 128 and 154. The superimposed carrier 36, original 26, and copy sheet 28 are advanced through the guideway 142 and are inserted between the outer periphery of the rotating drum 48 and the flexible belts 160 in the guide assembly 56 so that these assembled sheets are advanced past the light source 50 during continuing rotation of the drum 48.

The closure of the contacts 284 when the relay 280 is operated energizes the solenoid 302 and the counter 300 over a circuit including the closed contacts 313. The energization of the solenoid 302 clutches the ratchet type advancing mechanism for the mechanical counter in the assembly 300 to a drive means controlled by the solenoid 301 and also opens the contacts 305 and closes the contacts 304. The closure of the contacts 304 completes a holding circuit for the solenoid 302 extending through the closed contacts 303 and 313. When the contacts 305 are opened, the above-described operating circuit for the relay 270 is interrupted so that the contacts 272 are opened and the contacts 271 are closed. The opening of the contacts 272 interrupts the energizing circuit for the solenoid 228 so that the blade 218 is moved out of engagement with the periphery of the drum 48 to condition the machine 22 for producing a plurality of copies of the original 26 being fed into the machine 20 with the carrier 36. The closure of the contacts 283 when the relay 280 is operated energizes the solenoid 301 so that the counting mechanism is advanced one step indicating that the original 26 is being fed to the rotating drum 48 for the production of the first copy.

During the movement of the carrier 36, the original 26, and the assembled copy sheet 28, the trailing edge of the copy sheet 28 moves beyond the operator 114 to release the switch 116 and the carrier 36 moves beyond the operator 148 to release the switch 152. When the switch 152 is released, the operating circuit for the relay 280 is interrupted so that this relay releases to open the contacts 282-284 and to close the contacts 281. The opening of the contacts 283 and 284 interrupts the operating circuits for the solenoids 301 and 302 in the counter 300 but the solenoid 302 remains operated over the above-identified holding circuit. The opening of the contacts 282 interrupts one point in the operating circuit for the copy feed control solenoid 132, which circuit is also interrupted at the open contacts 116a as soon as the switch assembly 116 is released. The closure of the contacts 281 prepares an energizing circuit for the brake winding 108a in the assembly 108. When the swtich 116 is released, the contacts 116a are opened to interrupt the circuit described above, and the contacts 116b are closed to again complete the energizing circuit for the clutch winding 108b. This clutches the pulley 106 to the continuously rotating shaft 94 so that the shaft 84 is rotated to drive the wheels 82 and advance the uppermost copy sheet 28 in the stack thereof to the position in which it is interposed between the disengaged rollers 118 and 122 (FIG. 9).

During the continuing rotation of the drum 48, the copy sheet 28 is exposed by the light source 50 and the assembled carrier 36, original 26, and exposed copy sheet 28 are advanced to the point at which the copy sheet 28 is separated from the carrier 36 which is now magnetically retained in engagement with the outer surface of the drum 48 by the magnetic holding assembly 64. Thus, the separated copy sheet 28 moves upwardly with the flexible belts 160 held in engagement therewith by the vacuum or negative pressure in the chamber 174 and is eventually moved past the roller 182 into the developer unit 58. The exposed copy sheet 28 is then developed, dried, and discharged by the conveying means 60 (FIG. 1) into the tray 62. Since the ejecting or separating blade 218 is in its retracted position (FIG. 11), the carrier 36 and the original 26 carried thereon are moved beyond the separating point and the leading edge of the carrier 36 engages and deflects the roller 200 so that the switch assembly 196 is operated.

When the switch 196 is operated to a closed position (FIG. 17), the above-identified circuit is completed for operating the relay 280. In operating, the relay 280 opens the contacts 281 and closes the contacts 282-284. The opening of the contacts 281 interrupts the operating circuit for the brake winding 108a to release the rollers 82 for movement, and the closure of the contacts 282 energizes the solenoid 132 so that the rollers 122 are moved into engagement with the partially fed copy sheet 28 to bias it against the driven roller 118 (FIG. 10) so that this copy sheet is now advanced through the guideway 140 and into the guideway 142 and is further advanced through this guideway to the point at which its leading edge is aligned with and held against the leading edge of the carrier assembly 36. During continuing rotation of the drum 48, the rollers 118 and 122 and the flexible belts 160 feed the copy sheet 28 into a superimposed relation with the original 26 carried on the carrier 36 and move the assembled sheets past the light source 50 so that the second copy sheet is exposed in the manner set forth above.

The closure of the contacts 284 produces no useful function inasmuch as the solenoid 302 is maintained in an energized condition over the above-described holding circuit. Thus, the closure of the contacts 283 energizes the solenoid 301 so that the ratchet mechanism advances the mechanical counter in the unit 300 an additional step indicating that a second copy is being produced by the machine 20.

As the trailing edge of the carrier 36 moves beyond the roller 200, the switch 196 is released and, as the trailing edge of the copy sheet 28 passes the operator arm 114, the switch 116 is released. This opens the contacts 196 and 116a (FIG. 17) and closes the contacts 116b. The opening of the contacts 196 releases the relay 280 so that the contacts 281 are closed and the contacts 282-284 are opened. The closure of the contacts 116b energizes the clutch winding 108b so that the wheels 82 are again rotated to advance the top copy sheet 28 to the position interposed between the rollers 118 and 122 in which the switch 116 is again operated to open the contacts 116b and to close the contacts 116a. The closure of the contacts 116a energizes the brake winding 108a and the opening of the contacts 116b terminates the energization of the clutch winding 108b. Thus, the wheels 82 are now braked, and an additional copy sheet 28 is in a proper position.

This operation continues until such time as the counter 300 has been advanced to a setting representing the completion of the production of all of the desired number of copies. When the mechanical counter in the counter register unit 300 is advanced to this setting, the contacts 303 are mechanically opened to interrupt the holding circuit for the solenoid 302 so that when the switches 196 and 116 are restored to their normal condition, the solenoid 302 is no longer energized. When the solenoid 302 is released, the drive mechanism controlled by the winding 301 is disconnected from the mechanical counter, the contacts 304 are opened, and the contacts 305 are closed. The opening of the contacts 304 interrupts an additional point in the holding circuit for the solenoid 302, and the closure of the contacts 305 completes the above-described operating circuit for the relay 270 so that it operates to close the contacts 272 and to open the contacts 271.

The closure of the contacts 272 completes the above-described energizing circuit for the solenoid 228 so that the shaft 222 is pivoted in a clockwise direction to the position shown in FIG. 12 in which the separator or ejector blade 218 resiliently bears against the outer surface of the rotating drum 48. Thus, after the last copy sheet 28 has been exposed, separated by the belts 160, and forwarded to the developer unit 58, the leading edge of the carrier assembly 36 supporting the original 26 moves into engagement with the blade 218 and is ejected through the channel or guideways 234 in the manner described above. Incident to this last cycle of operation, the release of the switch 116 again energizes first the clutch winding 108b to advance a new copy sheet to the position shown in FIG. 9 and then the brake winding 108a to arrest movement of the feed wheels 82. Thus, all of the necessary copies have been produced and discharged to the receiving tray 62, the original has been ejected to the receiving tray or rack 70, and the machine 20 is in condition for an additional cycle of operation. The mechanical counter in the unit 300 has also been reset to its previous desired count setting.

If, at any time during the automatic production of a number of copies of the original 26 that is retained by the carrier 36 on the outer surface of the rotating drum 48, it becomes desirable to terminate the production of copies without completing the number set into the register 300, a "reject" button 34a can be depressed. The operation of this button opens the contacts 313 and closes the contacts 312. The opening of the contacts 313 interrupts the holding circuit for the solenoid 302 so that this solenoid releases, and, in doing so, restores the counter 300 to its normal condition in which the contacts 303 and 304 are opened and the contacts 305 are closed. The closure of the contacts 312 together with the subsequent closure of the contacts 305 completes the above-described operating circuit for the relay 270 so that it operates to close the contacts 272 and to open the contacts 271. The closure of the contacts 272 energizes the solenoid 228 so that the blade 218 is immediately moved into engagement with the outer surface of the rotating drum 48 to remove the carrier 36 and the original 26 carried thereon. The copy sheet 28 exposed during this last printing cycle is carried by the belts 160 into the developer unit 58. Thus, by the depression of the "eject" button 34a, the control circuit 66 immediately restores the machine 20 to a normal condition.

The machine 20 can also be used to produce single copies in which the single exposed copy sheet 28 is automatically advanced to the developer unit 58 by the belts 160. This operation is initiated by depressing the "reject" button 34a so that the contacts 312 are closed and the contacts 313 are opened. The opening of the contacts 313 prevents the establishment of a holding circuit for the solenoid 302, and the closure of the contacts 312 completes an operating circuit extending through the closed contacts 305 for energizing the relay 270 to close the contacts 272. These contacts energize the solenoid 228 so that the ejector blade 218 bears against the outer surface of the rotating drum 48. When the carrier 36 with the assembled original 26 thereon is then inserted into the machine 20 to operate the switch 152, the resulting operation of the relay 280 causes the partially fed copy sheet 28 to feed into a superimposed relation with the carrier 36 and original 26, and the subsequent sequential operation or energization of the windings 108b and 108a following the release of the solenoid 132 feeds another copy sheet 28 to the position shown in FIG. 9. The assembled carrier 36, original 26, and copy sheet 28 are exposed by the lamp 50, and the exposed copy sheet 28 is fed to the developer 58 by the upwardly extending flights of the flexible belts 160. Since the blade 28 now engages the outer surface of the rotating drum 48, the carrier 36 and the original 26 are separated from the drum 48 against the force of retention provided by the magnetic holding means 64 and are discharged through the tray 40 without passing through a complete cycle of rotation with the drum 48. Thus, the switch 196 is not actuated. The machine 20 can also be operated to produce a single copy with the "automatic" button 34a depressed merely by setting the counter 300 to a single copy setting.

The machine 20 and the control circuit 66 also include means automatically responsive to the depletion of the supply of copy sheets 28 during automatic operation of the machine for terminating the printing operation until the supply of paper has been replenished and for then automatically resuming operations to complete the partially executed order. This control is exercised by a switch 320 (FIG. 7) which is disposed beneath the table 74 and which is adapted to be operated upon depletion of the supply of copy sheets 28 either by direct engagement with the shaft 84, the wheels 82 or a mechanism actuated thereby. Thus, when the copy sheets are depleted, the wheels 82 and shaft 84 drop to a given position at which the switch 320 is operated (FIG. 17).

The switch 320 energizes a lamp 322 to visibly indicate the depletion of the supply of copy sheets 28, and an operating circuit for a relay 290 is completed so that this relay operates to open the contacts 291 and to close a pair of contacts 292. The opening of the contacts 291 interrupts the operating circuit for the clutch winding 108b so that the copy sheet feeding assembly 54 cannot be actuated. The closure of the contacts 292 completes an operating circuit for the relay 270 so that this relay operates to close the contacts 272 and energizes the ejection solenoid 228. Accordingly, the carrier 36 and the original 26 are ejected from the machine 20 during the following cycle of revolution of the drum 48, the last exposed copy sheet being fed to the developer unit 58 by the guiding means 56. However, even though the ejecting solenoid 228 is energized to eject the carrier 36 and the original 26 thereon, the clutch winding 302 in the counter 300 remains energized, and the mechanical counter in the unit 300 retains its previous setting indicating the number of copies in the current order that have to be produced.

When the supply of copy paper 28 is replenished so that the contacts 320 are opened to terminate the energization of the lamp 322, the relay 290 is also released to close the contacts 291 and to open the contacts 292. The opening of the contacts 292 interrupts the operating circuit for the relay 270 so that this relay releases to release the ejecting solenoid 228. This causes the ejector blade 218 to be moved to an ineffective setting. The closure of the contacts 291 causes the energization of the clutch winding 108b inasmuch as the contacts 116b are closed by the depletion of the supply of copy sheets 28. Thus, the assembly 52 feeds a copy sheet 28 to the partially advanced position illustrated in FIG. 9. When the carrier 36 and the previous original 26 are then reinserted through the throat 148 to operate the switch 152, the operation of the switch 152 causes the reoperation of the relay 280, and the superimposed carrier 36, original 26, and copy sheet 28 are fed to the rotating drum 48 in the manner described above. In addition, the relay 280 operates the counter 300 in the manner described above so that the count is changed to indicate that an additional copy is being made. The counter 300 is thereafter controlled by the switch assembly 196 in the manner described above until such time as all of the required number of copies has been made. At this time, the control circuit 66 and the machine 20 are restored to a normal condition in the manner described above.

The machine 20 can also be prepared or conditioned for manual operation in which single copies can be produced by manually feeding the original 26, with or without an assembled carrier 36, and a copy sheet 28 to the machine each time that a copy is desired. When operated in this mode, the copy sheet 28 is not separated from the carrier 36 and original 26 to be automatically developed by the unit 58 but is discharged together with the carrier and the original to the tray 70. To condition the control circuit for manual operation, a "manual" button 34a is actuated which closes the contacts 315 and 316 and opens the contacts 314.

The opening of the contacts 314 and the closure of the contacts 315 bypass the switch assembly 116 so that the means in the assembly 52 for automatically feeding a copy sheet 28 from the stack thereof are disabled. The feeding assembly 52 is disabled because the copy sheet 28 to be exposed is manually assembled with the carrier 36 and the original 26 prior to insertion into the machine 20. The closure of the contacts 315 also completes the circuit through the closed contacts 281 for energizing the brake winding 108a to brake the wheels 82.

The closure of the contacts 315 in conjunction with the closure of the contacts 316 connects the solenoid 250 across the output of the bridge network 324 so that this solenoid is energized to retract the armature 248 (FIG. 7). This pivots the shaft 244 in a counterclockwise direction about its axis to move the free ends of the deflector arms 242 beyond the outer surface of the flexible belts 160 to the position shown in dashed outline in FIG. 12. Thus, the deflector arms 242 in the assembly 72 are set to an active position to prevent the exposed copy sheet 28 from being separated from the assembled carrier 36 and original 26 and discharged into the developer unit 58.

The closure of the contacts 316 together with the closure of the contacts 315 also completes the operating circuit for a relay 260 so that this relay operates to open the contacts 261 and 262. The opening of the contacts 262 interrupts the operating circuit for the relay 280 so that control of this relay by the switches 196 and 152 is disabled. The opening of the contacts 261 releases the relay 270 so that contacts 272 are opened and the contacts 271 are closed. The closure of the contacts 271 maintains the solenoid 228 in an operated condition so that the ejector blade 218 continues to bear against the surface of the rotating drum 48.

The original 26 and a copy sheet 28 are now assembled on the carrier assembly 36 and advanced through the throat 149 (FIG. 6) into the nip between the rollers 154 and 128. These rollers advance the assembled sheets and carrier through the guideway 142 and between the drum 48 and the rotating flexible belts 160 so that this assembly is carried past the light source 50 for exposure and is advanced to the point in which the magnetic elements 42 and the carrier assembly 36 are subjected to the magnetic fields produced by the magnetic holding assembly 64. At this point the copy sheet 28 is normally separated by the moving flexible belts 160.

Since the deflecting elements 242 are in the position shown in FIG. 12, the copy sheet 28 is deflected toward the open end of the guideway 234. When the leading edge of the carrier 36 engages the deflecting blade 218, this carrier is separated from the outer surface of the rotating drum 48 and discharged into the open end of the guideway 234. Thus, both the exposed copy sheet 28, the carrier 36, and the original 26 are fed upwardly through the guideway 234 by continuing rotation of the drum 48. When the leading edges of these sheets are interposed between the rollers 236 and 238 (FIG. 6), these rollers complete the discharge of the exposed copy sheet 28, the original 26 and the carrier assembly 36 to the rack 70. The exposed copy sheet can then be inserted into a guideway 326 (FIG. 6) and advanced through the developer unit 58 in which it is developed and subsequently discharged into the rack 62 by the conveying means 60 (FIG. 1).

The machine 20 can be returned to a normal condition by pressing the "off" button 34a in the control unit 34. When this button is depressed, the contacts 311, 315, and 316 are opened, and the contacts 314 are closed. The operations of the contacts 314, 315, and 316 interrupt the energizing circuits for the relay 260 and the solenoids 228 and 250 so that they are restored to a normal condition. The opening of the contacts 311 removes the energization from the illustrated portion of the control circuit 66 so that all of the normally energized components are released. The portion 330 of the cricuit, however, remains energized to maintain the operability of the light source 50 and other components, such as the blower motor and drive motor. Thus, the machine 20 remains in a standby condition as long as the main switch 30 is in an on setting. When the "reject," "manual," or "automatic" button 34a is depressed, the contacts 311 are closed in combination with the other contact actuations described above to return the control circuit 66 to an operative condition in which the machine 20 is capable of performing in the selected mode.

Although the present invention has been described with reference to a number of illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An apparatus for making copies of a flexible original on copy sheets comprising a rotating and light transmitting drum, a light source within the drum, said original being wrapped at least partially around the drum to rotate with the drum, copy sheet feeding means for feeding copy sheets to move with the drum and original for exposure by the light source, separating means for removing the exposed copy sheets, and control means for detecting and the actual presence of the original on the drum at a point in the path of rotation of the drum positioned beyond the separating means in the direction of rotation of the drum and for controlling the operation of the copy sheet feeding means.

2. An apparatus for making copies on copy sheets from a flexible original comprising a rotating and light transmitting drum, a light source within the drum, said original being wrapped at least partially around the drum, copy sheet feeding means for feeding successive individual sheets into a superimposed relation with the original for movement with the drum to be exposed by the light source, means for removing the exposed copy sheets located at a point spaced from the point at which the copy sheets are supplied to the drum by the copy sheet feeding means so that a copy sheet makes less than one revolution with the drum, control means for detecting the actual presence of the original on the drum in a portion of the path of rotation of the drum that is disposed prior to the position at which the copy sheets are supplied by the copy sheet feeding means and beyond the position at which the copy sheets are removed, and means controlled by the control means for controlling the operation of the copy sheet feeding means.

3. An apparatus for making copies on copy sheets from a flexible original comprising a rotating and light transmitting drum, a light source within the drum, said original being wrapped at least partially around the drum, copy sheet feeding means for feeding individual sheets into a superimposed relation with the original for movement with the drum to be exposed by the light source, means for removing the exposed copy sheets located at a point spaced from the point at which the copy sheets are supplied to the drum by the copy sheet feeding means so that a copy sheet makes less than one revolution with the drum, control means for detecting the actual presence of the original on the drum in a portion of the path of rotation of the drum that is disposed prior to the position at which the copy sheets are supplied by the copy sheet feeding means and after the position at which the copy sheets are removed, and ejecting means controlled by the control means for removing the original from the drum.

4. An apparatus for making copies of a flexible original on copy sheets comprising a rotating and light transmitting drum, a light source within the drum, said original being at least partially wrapped around and rotating with the drum, copy sheet feeding means for feeding individual copy sheets to move with the drum and original for exposure by the light source, said copy sheet feeding means including electrically operable means for controlling the effectiveness of the copy sheet feeding means, separating means for removing exposed copy sheets from the drum, detecting means for detecting the actual presence of the original on the drum in a portion of the path of rotation of the drum that is disposed after the point at which the exposed copy sheets are removed by the separating means and prior to the point at which the copy sheets are fed by the copy sheet feeding means, and means controlled by the detecting means for controlling the electrically operable means.

5. The apparatus set forth in claim 4 including ejector means for removing the original from the drum, and means controlled by the detecting means for controlling the operation of the ejecting means.

6. An apparatus for making copies of a flexible original on copy sheets comprising a rotating drum, a light source adjacent the drum, said original being wrapped at least partially around the drum to rotate with the drum, copy sheet feeding means for feeding a copy sheet to move with the drum and original for exposure by the light source, first means for removing a copy sheet from the drum, spaced second means for removing the original and a copy sheet from the drum, and control means for selectively rendering either the first or the second means effective.

7. An apparatus for making copies of a flexible original on copy sheets comprising a rotating drum, a light source adjacent the drum, said original being wrapped at least partially around the drum to rotate with the drum, copy sheet feeding means for feeding a copy sheet to move with the drum and original for exposure by the light source, first means for removing a copy sheet from the drum at one point in its path of rotation, second means for removing a copy sheet from the drum at a second point in its path of rotation, and control means for selectively operating either the first or the second means.

8. An apparatus for making copies of a flexible original on copy sheets comprising a rotating means on which the original is detachably mounted, a light source adjacent the rotating member, means for feeding a series of copy sheets to move with the original and the rotating means for exposure to the light source, a pair of discharge channels disposed adjacent the rotating member, first means normally closing a first one of the channels to permit the copy sheets to be discharged through a second one of the channels, second means for closing the second discharge channel to prevent the discharge of the copy sheets through the second channel, said second means normally being in a position in which the second channel is open, and control means for selectively operating the second means to a position closing the second discharge channel and opening the first means to permit a copy sheet to be discharged through the first discharge channel.

9. The apparatus set forth in claim 8 including developer means communicating with said second channel for receiving the exposed copy sheets.

10. An apparatus for making copies of a flexible original on copy sheets comprising a rotating means on which the original is detachably mounted, a light source adjacent the rotating means, means for feeding a series of copy sheets to move with the original and the rotating means for exposure by the light source, a pair of discharge channels disposed adjacent the rotating member, first means normally closing a first one of the channels to permit the copy sheets to be discharged through a second one of the channels, said first means also including means for removing the original from the rotating means and for discharging the original through the first discharge means, second means operable to close the second discharge channel, and control means for controlling the first and second means, said control means being operable to one setting in which the second means is opened to permit copy means to be discharged through the second channel and the first means is opened to remove and discharge the original through the first channel, said control means also being operable to a second setting in which the second means closes the second channel and the first means is opened to discharge the original and the copy sheet through the first channel.

11. An apparatus for making copies on copy sheets from a flexible original comprising a rotating and light transmitting drum, a light source within the drum, means for feeding the original to the drum, said original being detachably mounted on the drum for continuous rotation with the drum until separated therefrom, copy sheet feeding means for feeding successive individual sheets to a first point adjacent the path of rotation of the drum and for then feeding the sheets into a superimposed relation with the original for movement with the drum to be exposed by the light source, means for removing the exposed copy sheets at a second point in the path of rotation spaced from the first point so that a copy sheet makes less than one revolution with the drum, control means disposed at a third point in the path of rotation of the drum for detecting the actual presence of the original on the drum, said third point being located beyond the second point and prior to the first point considered in the direction of rotation of the drum, and means controlled by the control means for controlling the operation of the copy sheet feeding means.

12. The apparatus set forth in claim 11 including ejecting means located adjacent the path of rotation of the drum between the second and third points and operable to remove the original from the drum.

13. An apparatus for making copies on copy sheets from a flexible original comprising a rotating and light transmitting drum, a light source within the drum, original feeding means for feeding an original to the drum, copy sheet feeding means for feeding successive individual copy sheets to the drum, conveying means for moving a copy sheet in a superimposed relation with the original on the drum and through a first portion only of the path of rotation of the drum to permit the copy sheet to be exposed by the light source, separating means for removing the exposed copy sheets from the drum located at a point adjacent the end at said first portion of the path of rotation so that a copy sheet makes less than one revolution with the drum, means for releasably retaining the original on the drum to make successive complete cycles of rotation with the drum, control means disposed adjacent the path of rotation of the drum spaced in the direction of rotation from the separating means for detecting the actual presence of the original on the drum in a portion of the path of rotation of the drum that follows the removal of the copy sheets, means controlled by the control means for controlling the operation of the copy sheet feeding means, and ejecting means operable to remove the original from the drum when the desired number of copies have been made.

References Cited by the Examiner

UNITED STATES PATENTS

| | | | |
|---|---|---|---|
| 2,822,170 | 2/58 | Frantz | 271—64 |
| 3,009,697 | 11/61 | Halden | 271—64 |
| 3,091,169 | 5/63 | Taini et al. | 95—77.5 |
| 3,128,093 | 4/64 | Highsmith et al. | 271—64 |
| 3,161,129 | 12/64 | Linthout | 95—77.5 |

EVON C. BLUNK, *Primary Examiner.*